United States Patent
Hand et al.

(10) Patent No.: US 9,505,204 B2
(45) Date of Patent: Nov. 29, 2016

(54) METHOD FOR MAKING AND JOINING COMPOSITE SANDWICH SHELL EDGE JOINT

(71) Applicant: The Boeing Company, Chicago, IL (US)

(72) Inventors: Michael Leslie Hand, Huntington Beach, CA (US); Douglas A. McCarville, Orting, WA (US); Juan Carlos Guzman, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 142 days.

(21) Appl. No.: 14/298,395

(22) Filed: Jun. 6, 2014

(65) Prior Publication Data

US 2014/0352876 A1    Dec. 4, 2014

Related U.S. Application Data

(62) Division of application No. 12/950,191, filed on Nov. 19, 2010, now Pat. No. 8,784,596.

(51) Int. Cl.
*B29C 70/46* (2006.01)
*B29C 65/70* (2006.01)
(Continued)

(52) U.S. Cl.
CPC ....... *B32B 38/1866* (2013.01); *B29C 66/5221* (2013.01); *B29C 66/5241* (2013.01); *B29C 66/721* (2013.01); *B29C 66/72523* (2013.01); *B29C 70/46* (2013.01); *Y10T 403/553* (2015.01)

(58) Field of Classification Search
CPC .......... B29C 66/5221; B29C 66/5241; B29C 66/5261; B29C 66/721; B29C 66/004; B29C 66/72523
See application file for complete search history.

(56) References Cited

U.S. PATENT DOCUMENTS 1,561,102 A    11/1925  Mott
1,575,681 A     3/1926  Griffiths
(Continued)

FOREIGN PATENT DOCUMENTS

DE    1501704            4/1969
DE    2421936 A1  *  11/1975 ............. B29C 57/00
(Continued)

OTHER PUBLICATIONS

United States Patent and Trademark Office, "Non-Final Office Action," issued in connection with U.S. Appl. No. 12/950,191, Jul. 20, 2012, 19 pages.
(Continued)

*Primary Examiner* — William Bell
(74) *Attorney, Agent, or Firm* — Hanley, Flight & Zimmerman, LLC (57) ABSTRACT

A method for joining fittings to a composite sandwich shell edge includes laying up an inner facesheet and positioning a wrapped flute mandrel on top; applying a layer of adhesive on the inner facesheet and positioning spacer-supported fittings on top; applying adhesive over the co-bonded fittings and laying up an outer facesheet forming an assembly; curing the assembly under heat and pressure; removing the fittings by first collapsing the spacers and removing the flute mandrel; placing an adhesive layer on the fittings with collapsible spacers inserted therein; reinserting the fittings between the inner and outer facesheets and effecting bonding and curing; and removing the spacers from the fittings by collapsing the spacers.

22 Claims, 8 Drawing Sheets

(51) Int. Cl.
  *B32B 38/18* (2006.01)
  *B29C 65/00* (2006.01)

(56) References Cited

U.S. PATENT DOCUMENTS

| | | |
|---|---|---|
| 3,011,674 A | 12/1961 | Jackson |
| 3,285,794 A | 11/1966 | Brownlee et al. |
| 3,487,971 A | 1/1970 | Kirgis et al. |
| 3,680,727 A | 8/1972 | Pearson |
| 3,842,775 A | 10/1974 | Edwards et al. |
| 3,979,350 A | 9/1976 | Winter |
| 4,050,609 A | 9/1977 | Okamoto et al. |
| 4,106,424 A | 8/1978 | Schuler et al. |
| 4,343,413 A | 8/1982 | Chatzipetros et al. |
| 4,672,906 A | 6/1987 | Asai |
| 4,731,151 A | 3/1988 | Kaller et al. |
| 4,824,513 A | 4/1989 | Dodds |
| 4,842,670 A | 6/1989 | Callis et al. |
| 4,937,032 A | 6/1990 | Krone et al. |
| 5,024,399 A | 6/1991 | Barquet et al. |
| 5,085,343 A | 2/1992 | Scarr |
| 5,129,534 A | 7/1992 | Dunn |
| 5,143,328 A | 9/1992 | Leonard |
| 5,171,510 A | 12/1992 | Barquet et al. |
| 5,257,761 A | 11/1993 | Ratz et al. |
| 5,651,474 A | 7/1997 | Callaghan et al. |
| 5,709,252 A | 1/1998 | Princiotta et al. |
| 5,776,277 A | 7/1998 | Wambeke |
| 5,817,269 A | 10/1998 | Younie et al. |
| 6,082,676 A | 7/2000 | Cochran |
| 6,158,605 A | 12/2000 | DeLay |
| 6,802,169 B2 | 10/2004 | Simmons |
| 7,093,337 B1 | 8/2006 | Taylor |
| 7,540,143 B1 | 6/2009 | Greene |
| 7,640,961 B2 | 1/2010 | Stubner et al. |
| 7,669,729 B2 | 3/2010 | Matsuoka et al. |
| 7,699,188 B2 | 4/2010 | Oliveira et al. |
| 7,998,299 B2 * | 8/2011 | McCarville ............ B29C 70/30 156/189 |
| 8,484,848 B2 * | 7/2013 | Gallant ................. B29C 65/56 244/120 |
| 8,784,596 B2 | 7/2014 | Hand et al. |
| 8,815,038 B2 * | 8/2014 | McCarville ........... B29C 70/086 156/218 |
| 8,875,931 B2 | 11/2014 | Hand et al. |
| 2002/0023926 A1 | 2/2002 | Dhellemmes |
| 2004/0025955 A1 | 2/2004 | Skinner et al. |
| 2004/0183227 A1 | 9/2004 | Velicki et al. |
| 2005/0126699 A1 | 6/2005 | Yen et al. |
| 2005/0260481 A1 | 11/2005 | Finkelshtain et al. |
| 2006/0115324 A1 | 6/2006 | Zenda et al. |
| 2006/0225265 A1 | 10/2006 | Burnett et al. |
| 2008/0129041 A1 * | 6/2008 | Allen ................. B29C 66/1142 285/55 |
| 2009/0285652 A1 | 11/2009 | Williams |
| 2010/0043955 A1 * | 2/2010 | Hornick ............ B29C 65/5057 156/182 |
| 2010/0065688 A1 * | 3/2010 | Wood ................... B29C 65/562 244/131 |
| 2010/0132884 A1 * | 6/2010 | Baehmann ........... B29C 65/542 156/293 |
| 2010/0143148 A1 | 6/2010 | Chen et al. |
| 2011/0067795 A1 * | 3/2011 | Hancock ................ F03D 1/001 156/60 |
| 2012/0045606 A1 * | 2/2012 | Griess ...................... B32B 3/06 428/57 |
| 2012/0125530 A1 | 5/2012 | Hand et al. |
| 2012/0128408 A1 | 5/2012 | Hand et al. |
| 2013/0129409 A1 * | 5/2013 | Cho ................... B29C 65/4835 403/266 |

FOREIGN PATENT DOCUMENTS

| | | | |
|---|---|---|---|
| DE | 19607061 C1 * | 5/1997 | .......... B29C 66/022 |
| DE | 102009015612 | 10/2010 | |
| EP | 1657453 | 5/2006 | |
| FR | 2236725 | 2/1975 | |
| GB | 2054791 | 2/1981 | |
| JP | 2001032372 | 2/2001 | |
| WO | 2009038925 | 3/2009 | |
| WO | 2009109619 | 9/2009 | |

OTHER PUBLICATIONS

United States Patent and Trademark Office, "Final Office Action," issued in connection with U.S. Appl. No. 12/950,191, Jan. 31, 2013, 16 pages.

United States Patent and Trademark Office, "Restriction Requirement," issued in connection with U.S. Appl. No. 12/950,191, Apr. 30, 2012, 6 pages.

European Patent Office, Extended European Search Report, for EP Patent Application Serial No. 11188622.2, issued on May 23, 2012, (9 pages).

United States Patent and Trademark Office, "Final Office Action," issued in connection with U.S. Appl. No. 12/950,144, Feb. 27, 2014, 15 pages.

United States Patent and Trademark Office, "Non-Final Office Action," issued in connection with U.S. Appl. No. 12/950,144, Sep. 25, 2013, 16 pages.

United States Patent and Trademark Office, "Non-Final Office Action," issued in connection with U.S. Appl. No. 12/950,144, Jun. 18, 2012, 20 pages.

United States Patent and Trademark Office, "Final Office Action," issued in connection with U.S. Appl. No. 12/950,144, Dec. 19, 2012, 26 pages.

United States Patent and Trademark Office, "Restriction Requirement," issued in connection with U.S. Appl. No. 12/950,144, Mar. 8, 2012, 7 pages.

United States Patent and Trademark Office, "Notice of Allowance," issued in connection with U.S. Appl. No. 12/950,191, Mar. 6, 2014, 18 pages.

United States Patent and Trademark Office, "Notice of Allowance", issued in connection with U.S. Appl. No. 12/950,144, mailed on Aug. 12, 2014, 34 pages.

European Patent Office, "Extended European Search Report", issued in connection with European Patent Application No. 11189988.6, issued on Jan. 18, 2016, 8 pages.

United States Patent and Trademark Office, "Non-Final Office Action," issued in connection with U.S. Appl. No. 14/502,018, mailed on Jul. 12, 2016, 39 pages.

United States Patent and Trademark Office, Notice of Allowance, issued in connection with U.S. Appl. No. 14/502,018, mailed on Sep. 30, 2016, 19 pages.

* cited by examiner

METHOD FOR MAKING AND JOINING COMPOSITE SANDWICH SHELL EDGE JOINT

RELATED APPLICATIONS

This patent arises from a divisional of U.S. patent application Ser. No. 12/950,191, filed Nov. 19, 2010, now U.S. Pat. No. 8,784,596, which is hereby incorporated by reference herein in its entirety.

This application is related to U.S. patent application Ser. No. 12/950,144, filed Nov. 19, 2010, and entitled "Composite Sandwich Shell Edge Joint."

TECHNICAL FIELD

The disclosure generally relates to joints for composite structures and more particularly, relates to methods for making highly weight-efficient, mechanically-fastened joint fittings and joining the fittings to composite sandwich shell edges.

BACKGROUND

Sandwich construction shells, in which facesheets are joined by a shear-carrying core, are the minimum weight solution for a wide range of structures. Composite materials such as graphite/epoxy may be used to make lighter structures than the metals that were formerly applied to most weight-critical structures. Joint designs have been lagging behind the development of the acreage areas of these structures.

Figure 1:
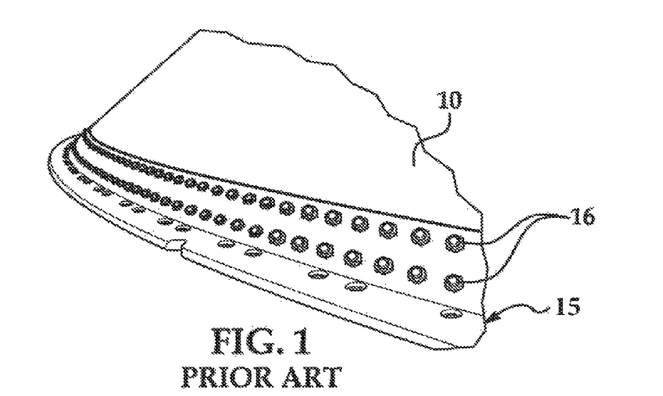
FIG. 1 is a perspective view of a conventional edge joint on a composite sandwich shell.

Joining approaches that have been traditionally used for metal structures may not be applied unmodified to composite structures because of the lack of ductility in composites and limited bearing capability of thin composite facesheets. Sandwich structures may present further challenges since the facesheet-to-core bond may be compromised in combined shear and peel if subjected to concentrated loads. The state of the art attempts to avoid these problems by transitioning from sandwich construction to thick solid laminates at the edge of the shell and then using a metal joint member 15 which can be fastened conventionally by bolts 16. This is shown in FIG. 1 for the edge joint assembly 10. However, the cost of mechanically attaching metal frames to solid laminate may be high due to the requirement to drill a large number of close tolerance holes in the composite, in addition to a severe weight penalty.

An additional shortcoming associated with many conventional sandwich edge joints is that the joints may transition to an asymmetrical flange configuration which may cause tension loads across the joint to put the adjacent shell in bending. To carry these secondary bending loads in addition to the primary in-plane loads, it may be necessary to locally reinforce the shell. This may add additional weight that may not be required in a joint structure with straighter load paths.

Coefficient of thermal expansion mismatch between metal joint elements and adjacent composites may result in additional stresses in the structure. For structures which are exposed to wide ranges of temperatures, such as launch vehicle components, substantial weight penalties may be imposed by the need to either reinforce the structure to carry these mismatch loads or soften the structure radially to mitigate strain mismatch.

Therefore, a method for making a highly weight-efficient, combination bonded and mechanically-fastened joint configuration for composite sandwich shell edges is needed.

SUMMARY

The disclosure is directed to a method for making a highly weight-efficient, combination bonded and mechanically-fastened composite sandwich shell edge joint. An illustrative embodiment of the method includes providing an outboard buildup pad, providing an inboard buildup pad that is spaced-apart and adjacent to the outboard buildup pad, bonding an outboard facesheet to the outboard buildup pad, bonding an inboard facesheet to the inboard buildup pad, providing bridging plies connecting the inboard buildup pad and the outboard buildup pad and mounting at least one barrel nut installed in the buildup pads.

The disclosure is further directed to a method for joining fittings to a composite sandwich shell edge. An illustrative embodiment of the method includes laying up an inner facesheet and positioning a wrapped flute mandrel on top; applying a layer of adhesive on the inner facesheet and positioning spacer-supported fittings on top; applying adhesive over the co-bonded fittings and laying up an outer facesheet forming an assembly; curing the assembly under heat and pressure; removing the fittings by first collapsing the spacers and removing the flute mandrel; placing an adhesive layer on the fittings with collapsible spacers inserted therein; reinserting the fittings between the inner and outer facesheets and effecting bonding and curing; and removing the spacers from the fittings by collapsing the spacers.

In an alternate embodiment, the method for fabricating a composite sandwich shell edge joint may include the use of fluorocarbon spacer bars in place of the fittings to form the fitting cavity during the cure of the facesheets and core. This embodiment has the advantage of reducing the risk of mark-off on the facesheets by placing fewer inches of edge against the facesheet during cure. The counterbalancing disadvantage is that the geometry of the fluorocarbon spacer bars must be carefully controlled and adequate caul strips provided at the joints between blocks to prevent a larger scale mark-off problem at the joints between blocks.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Referring now to FIGS. 2-4B, an illustrative embodiment of the composite sandwich shell edge joint, hereinafter joint, is generally indicated by reference numeral 1. In some applications, the joint 1 may be applied as a skirt end joint on a composite cryotank 34 used for launch vehicles in the aerospace industry. However, it is to be understood that the joint 1 may be applicable to joining composite materials in any other type of structure and may serve as a minimum weight solution for a wide range of structures in various industries. The joint 1 may achieve greater efficiencies than conventional joints for weight-critical applications such as aerospace structures, for example and without limitation. The joint 1 may be an all-composite joint, thereby avoiding the manufacturing and stress problems rising from coefficient of thermal expansion mismatch in hybrid joints with metal rings attached to composite shells.

Figure 2:
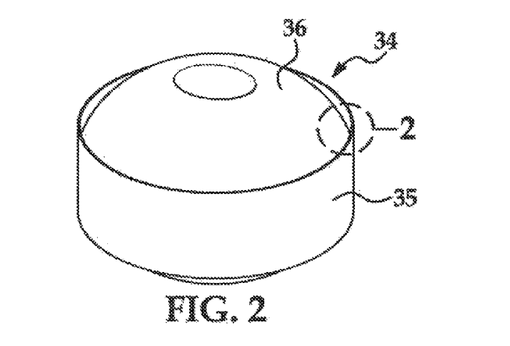
FIG. 2 is a perspective view of a composite cryotank in implementation of an illustrative embodiment of the composite sandwich shell edge joint.
Figure 3:
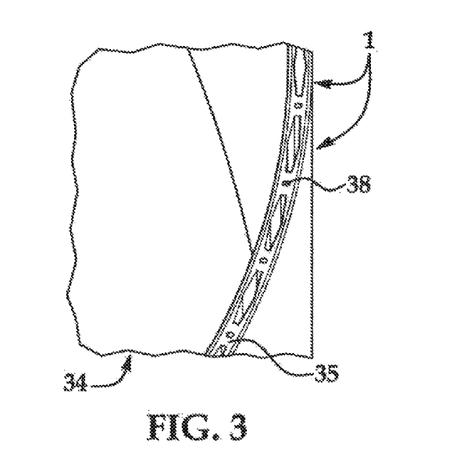
FIG. 3 is an oblique view of a composite cryotank skirt edge.
Figure 4:
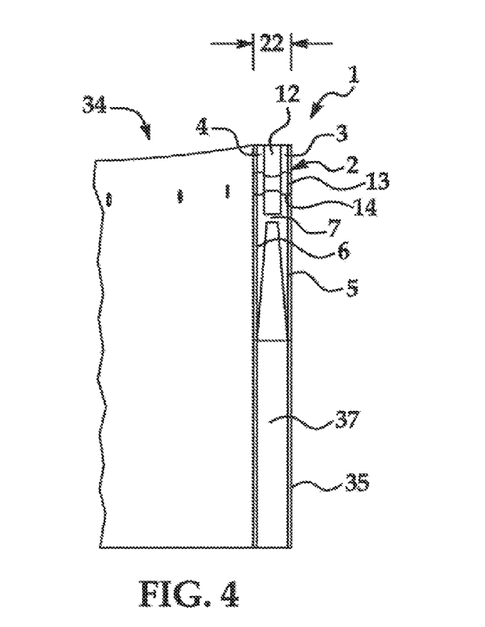
FIG. 4 is a sectional view of an illustrative embodiment of the composite sandwich shell edge joint in which the entire joint buildup has been cured in place in a single co-bond step.

As shown in FIG. 2, the composite cryotank 34 may include a generally cylindrical tank wall 35 and a tank dome 36 on the tank wall 35. As shown in FIG. 4, the tank wall 35 may include a fluted core 37. Multiple joints 1 may be arranged in adjacent relationship to each other on the fluted core 37 and along the edge of the tank wall 35. As illustrated in FIG. 4, each joint 1 may include a joint body 2 having an outboard tapered buildup pad 5; an inboard tapered buildup pad 6; and bridging plies 7 which connect the outboard tapered buildup pad 5 and the inboard tapered buildup pad 6. An outboard facesheet 3 may be co-cured, co-bonded or bonded to the outboard tapered buildup pad 5. An inboard facesheet 4 may be co-cured, co-bonded or bonded to the inboard tapered buildup pad 6.

As further shown in FIG. 4, a barrel nut 14 may extend through the barrel nut opening 13 and may be engaged by bolt 12 which is inserted into an opening in the bridging plies 7. The barrel nut 14 may be a standard fastener type which is well-suited to incorporation in the joint 1. The barrel nut 14 may be positioned so that the interfacing fastener centerline is nominally located on the center surface of the sandwich shell which is defined by the outboard facesheet 3 and the inboard facesheet 4. This placement of the barrel nut 14 may minimize bending loads being introduced into the tank wall 35 by limiting loading to mainly tension loads transmitted through the barrel nut. In some applications, if needed, additional joint strength may be obtained by using custom barrel nuts with a larger surface area in bearing against the bridging plies 7 and facesheets 3 and 4 and/or with radiused corners at the ends of the cylindrical nut body of the barrel nut. The number of joints 1, hence barrel nuts 14, which are used in a given application can be determined by the tensile line load that each joint 1 must carry.

The composite outboard tapered buildup pad 5 and inboard tapered buildup pad 6 of the joint body 2 may be configured to efficiently transfer load from the barrel nut 14 to the outboard facesheet 3 and the inboard facesheet 4. Fabrication methods may provide good clamp-up pressure to the film adhesive bondlines between the buildup pads 5, 6 and facesheets 3, 4. A thin, uniform, bondline is stronger than a thick bondline or one with varying thickness across the bond.

Figure 4A:
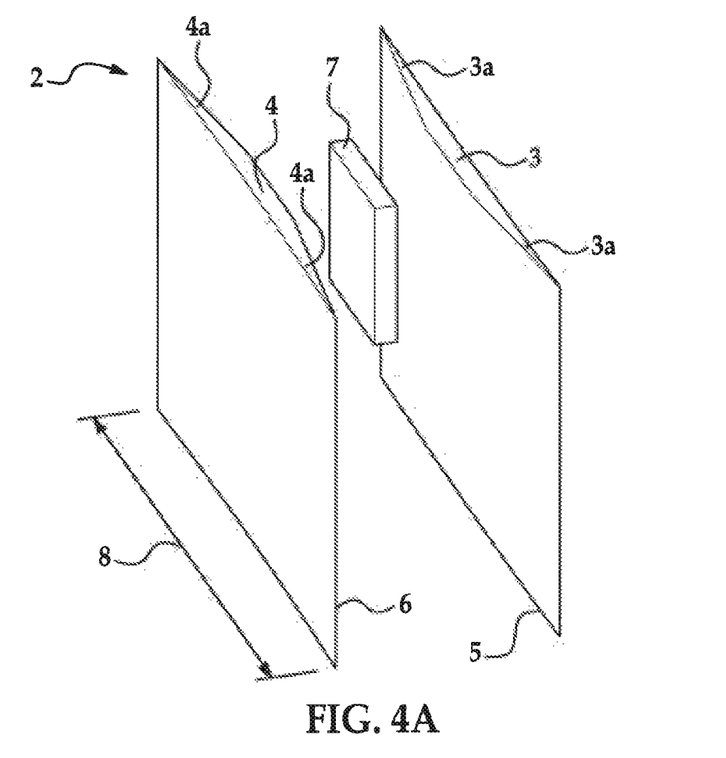
FIG. 4A is an exploded perspective view of a joint body component of an illustrative embodiment of the composite sandwich shell edge joint.

Overall pad width of each buildup pad 5, 6, as shown in FIG. 4, may be chosen to minimize the unsupported length of the facesheet 3, 4 between pads 5, 6. The width of the pads 5, 6 at their interface to the bridging plies 7 may be chosen to provide sufficient area to meet the joint compressive line load requirements. Pad, at right angles to the joint edge, may be dictated by the length of solid laminate required to transfer loads from the bridging plies 7 to the pads 5, 6 plus the length of tapered flange required to shear load into the facesheets 3, 4 without delamination. As shown in FIG. 4A, the extensions 3*a*, 4*a* of the facesheets 3, 4, respectively, past the bridging plies 7 may be chosen to match the fore-and-aft length 8 of the buildup pads 5, 6, so that there may be a minimal length of unsupported face sheet 3, 4 between the bridging plies 7 and the pads 5, 6.

Figure 4B:
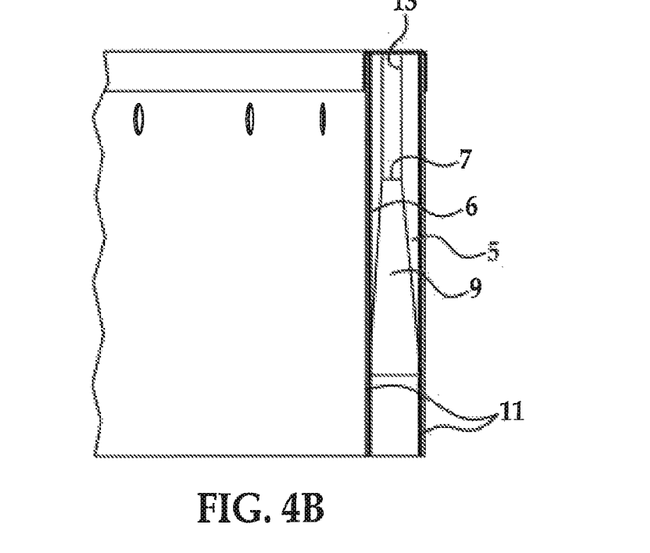
FIG. 4B is a sectional view of a sandwich shell edge joint with tapering buildup pads extending toward bridging plies to form a natural plenum for distributing flows between flutes.

Each buildup pad 5, 6 may be thickest in the area where the barrel nut 14 is installed and may taper toward the edges. The thin edges on the build-up pads 5, 6 may reduce shear peaking to maximize attainable bonded joint strength. Fluted cores, for example and without limitation, may be a good candidate for launch vehicle composite sandwich structures because of their suitability for pre-launch purging. FIG. 4B illustrates how the two tapering buildup pads 5, 6 extending toward the bridging plies 7 form a natural plenum 9 for distributing flows between flutes 11. In this instance, purge requirements may lead to extending the longitudinal flanges of the buildup pads 5, 6 to increase the cross-sectional area of the plenum 9 they naturally form. Depending on whether purge flows are to be immediately vented overboard or collected for disposal at some distance from the launch pad, venting cutouts (not illustrated) may be added to the skirt ends between barrel nut installations or a closeout channel 13 may be added over the component-to-component interface surface to seal off the plenum 9.

Solid laminate may be required across the section in which each barrel nut 14 is installed. This may be obtained by placing the bridging plies 7 between the two buildup pads 5, 6. Since the bridging plies 7 may pick up only a small fraction of the load transmitted through the barrel nut 14, the joints between the bridging plies 7 and the buildup pads 5, 6 may be less critical than the bonded joints between the buildup pads 5, 6 and the facesheets 3, 4.

Figure 5:
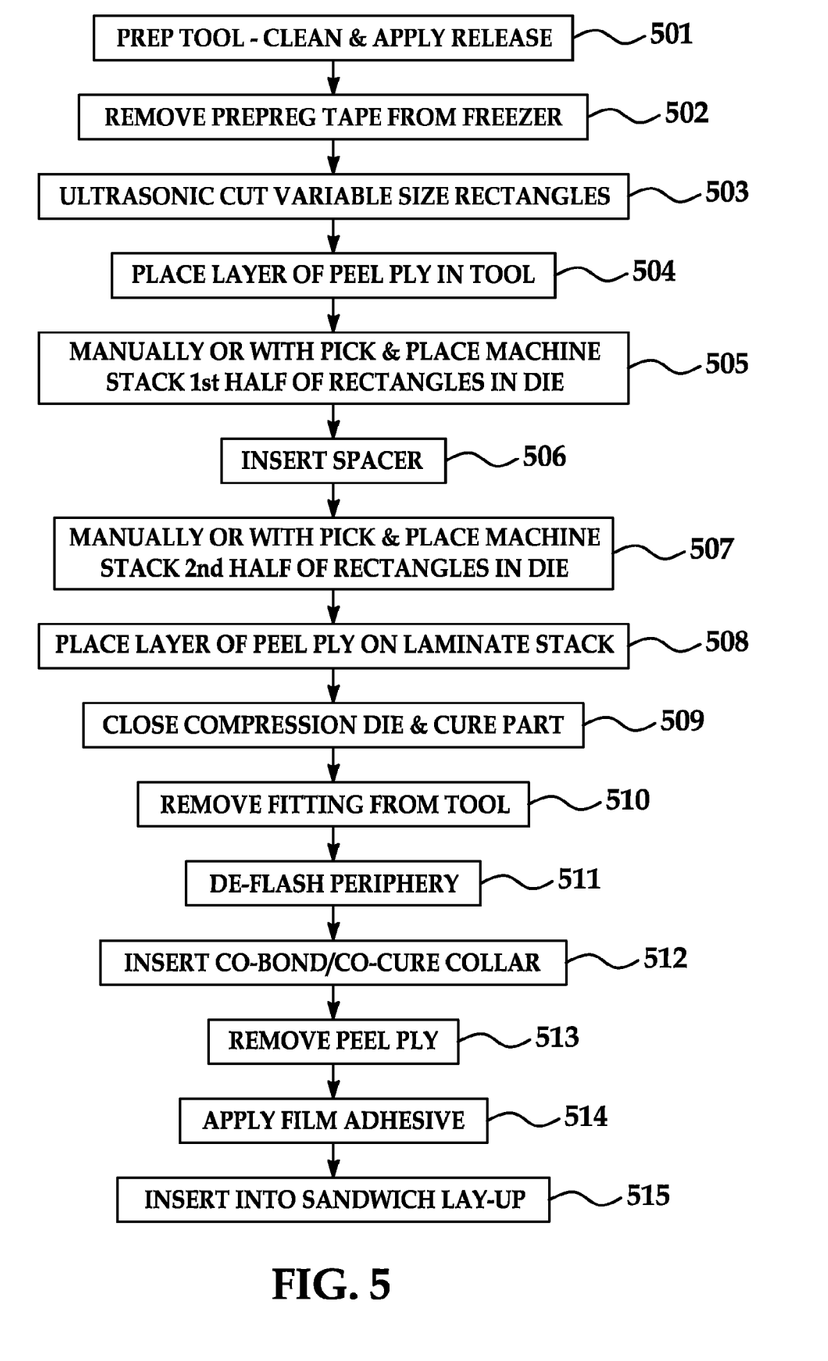
FIG. 5 is a block diagram illustrating the process flow for fabricating a fitting for the sandwich shell edge joint.

FIG. 5 provides a schematic process flow for a preferred method of making the fitting. Since a full scale sandwich panel of the fitting may be in the neighborhood of 1.5" thick, the fitting may consist of a couple of hundred specially orientated and shaped rectangular blanks. Therefore, it is suggested that an ultrasonic cutout/pick and place machine that is commercially available be used to size and stack these laminate layers. A spacer insert is required when all the lower tapered plies are in place to support and define edge periphery during cure. Once the insert is in place, the top tapered plies can be placed. To insure tight dimensional control the fitting is made in a compression picture frame die using relatively high cure pressures (100 to 500 psi) to insure that the material squeezes down to the desired thickness and that the part is free from porosity.

Figure 6:
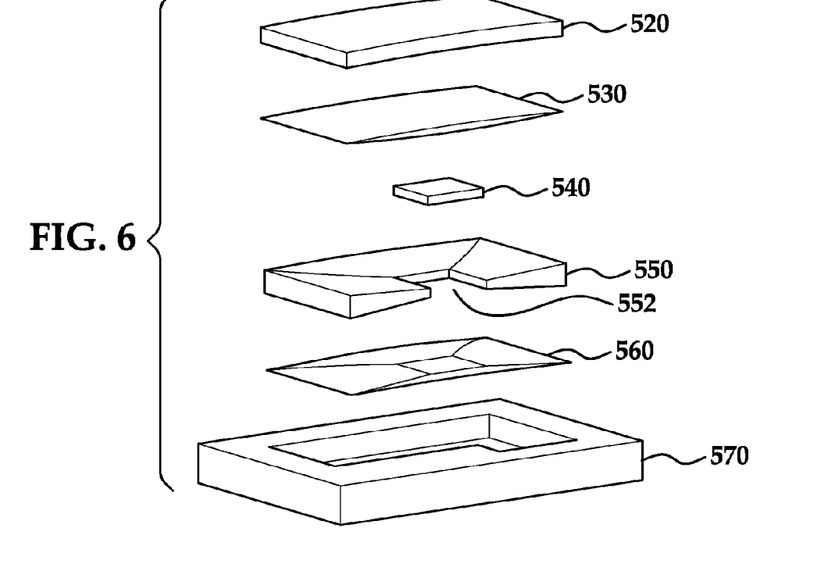
FIG. 6 is an exploded view of the components of the tooling used in fabricating the fitting.
Figure 7A:
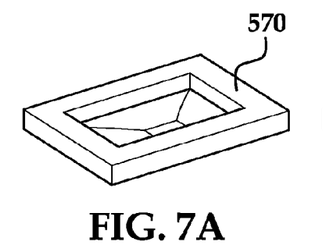
FIG. 7A is a perspective view of a fabrication process for the fitting illustrating an inboard play stack placed in a cavity tool.
Figure 7B:
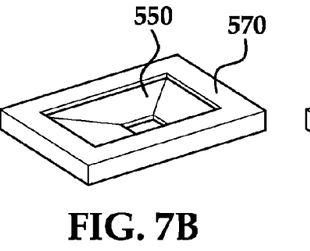
FIG. 7B is a perspective view of the fabrication process for the fitting illustrating a collar tool placed on the inboard ply stack.
Figure 7C:
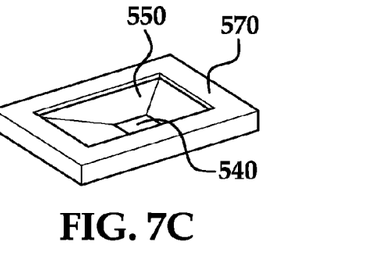
FIG. 7C is a perspective view of the fabrication process for the fitting illustrating a bridge ply stack placed in a pocket of the collar tool.
Figure 7D:
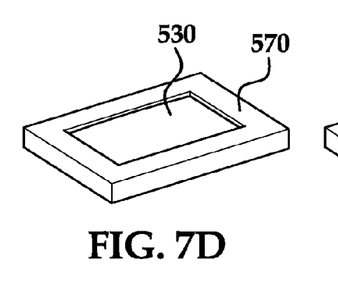
FIG. 7D is a perspective view of the fabrication process for the fitting illustrating an outboard ply stack placed in the cavity tool
Figure 7E:
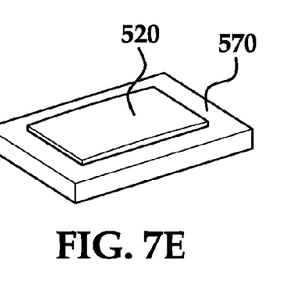
FIG. 7E is a perspective view of the fabrication process for the fitting illustrating a compactor tool placed on the outboard ply stack and cured.
Figure 7F:
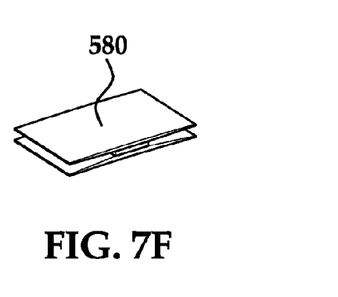
FIG. 7F is a perspective view of the fabrication process for the fitting illustrating a cured fitting removed from the tooling.

The fabrication process for the fittings used in the present disclosure composite sandwich shell edge joint is shown in FIGS. 5, 6 and 7. FIG. 5 is a block diagram illustrating the process flow for the fabrication of the fittings. For instance, in the process steps 501, 502, 503, 504, and 505, the forming tool, which includes the compactor tool 520, the collar tool 550 and the cavity tool 570, is first prepared by cleaning and applying a release coating. The prepreg tapes are then removed from the freezer and ultrasonically cut to variable rectangular sizes. This includes, as shown in FIG. 6, the outboard ply stack 530, the bridge ply stack 540 and the inboard ply stack 560. After a layer of peel ply is placed in the tool 570, a first stack half of rectangular plies stack 560 is placed manually or by a stack machine. In the next process steps of 506, 507, 508 and 509, a spacer of a collar tool 550 is inserted into the cavity tool 570. A second stack half of rectangular plies, or the bridge ply stack 540 is then manually or automatically placed in the die. After a layer of a peel ply is placed on the laminate stack formed by the inboard ply stack 560, the bridge ply stack 540 and the outboard ply stack 530, the compactor tool 520 is then closed and the part is cured. In the final steps of 510, 511, 512, 513, 514 and 515, the fitting after cured is removed from the tool and the periphery of the fitting is de-flashed. A co-bond/co-cure collar is then inserted while the peel ply is removed and a film adhesive layer is applied, the fittings are then inserted into a sandwich lay-up. It should be noted that steps 512-515 involve the mounting of the fittings into a sandwich lay-up.

The various processing steps for forming the fitting are further shown in FIG. 7 in six steps of 7*a*, 7*b*, 7*c*, 7*d*, 7*e* and 7*f*. For instance, 7*a* shows the inboard ply stack is placed in the cavity tool 570, 7*b* shows the collar tool 550 is placed on top of inboard ply stack 560, 7*c* shows that the bridge ply stack 540 is placed in the pocket 552 of collar tool 550, 7*d* shows that the outboard ply stack 530 is placed in the cavity tool 570, 7*e* shows that the compactor tool 520 is placed on top of the outboard ply stack 530 and cured, and 7*f* shows a cured fitting 580 removed from the tooling.

Figure 8:
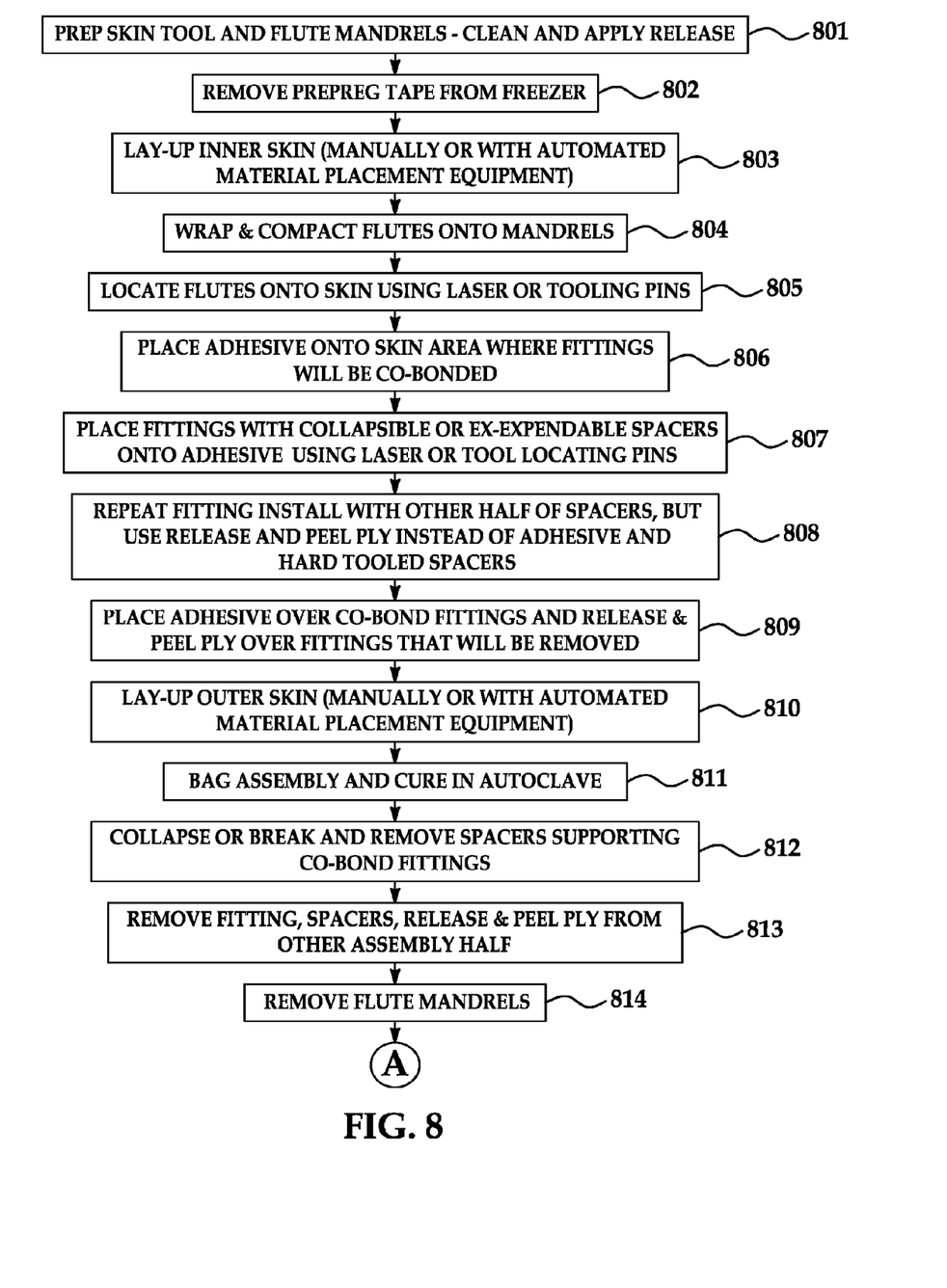
FIG. 8 is a block diagram illustrating the process flow for joining fittings to a composite sandwich shell edge.

FIG. 8 is a block diagram illustrating the process flow for joining fittings to a composite sandwich shell edge. In general, the fittings must be supported by either hard or collapsible/expandable spacers. The major flow steps, as shown in FIG. 9, include placing the inner skin 902, placing the flutes 904 and fitting/spacers 906 on the inner skin 902, and then placing the outer skin 912 on the flutes 904 and spacers 906. These steps are shown as steps 801, 802, 803, 804, 805, 806, 807, 808, 809, and 810 in FIG. 8. On one side of the part, the fittings 906 can be co-bonded in place with adhesive, but on the other side the fittings must be initially placed with a release film and peel ply and secondarily bonded with film adhesive. The bonded side fitting must be temporarily removed after initial cure to allow for flute mandrel extraction. These steps are shown in FIG. 8 by the steps of 811, 812, 813 and 814. Later they can be reinserted into the sandwich panel, with film adhesive, to facilitate a high temperature bond (250° or 350° F.). Removable spacer tooling must be used to support fittings that are undergoing co-bond or bond. But solid spacer tools can be used when the fittings are subsequently removed to allow for flute mandrel removal. Fittings can be located on sandwich panel skins using a laser projection system, tooling pins at the barrel nut locations, or a system where the spacers pin to the lay-up mandrel. In so doing, the fittings are bonded to the sandwich panel to exacting dimensions (i.e., ±0.005"). Moreover, unlike other metallic and composite end ring solutions, the fittings described in this disclosure require no mechanical fasteners to facilitate joining to sandwich panel face skins. These steps are represented in FIG. 8 by steps 815, 816, 817, 818, 819, 820, 821 and 822.

Figure 9A:
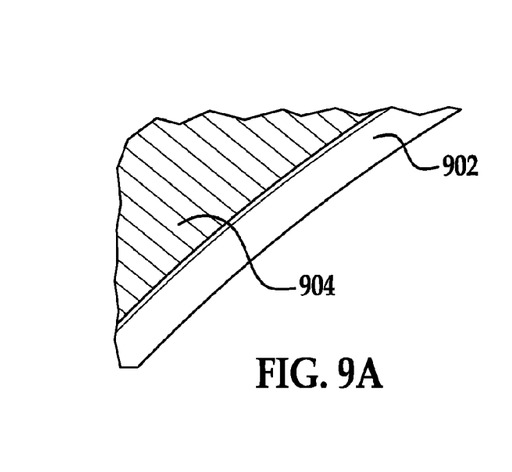
FIG. 9A is a perspective view of a process for joining fittings to a composite sandwich shell edge illustrating an inner facesheet laid up and wrapped flute mandrels placed on top.
Figure 9B:
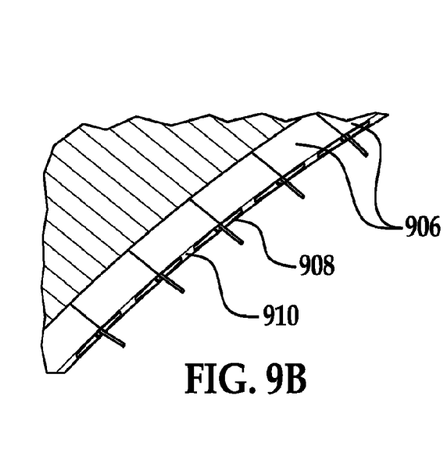
FIG. 9B is a perspective view of the process for joining fitting to the composite sandwich shell edge illustrating fittings each with supporting, inflatable collars and a release film 910 placed on the inner facesheet.
Figure 9C:
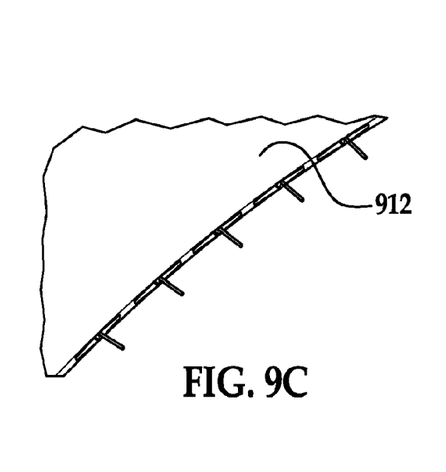
FIG. 9C is a perspective view of the process for joining fitting to the composite sandwich shell edge illustrating an outer facesheet laid up over the flutes and the fittings.
Figure 9D:
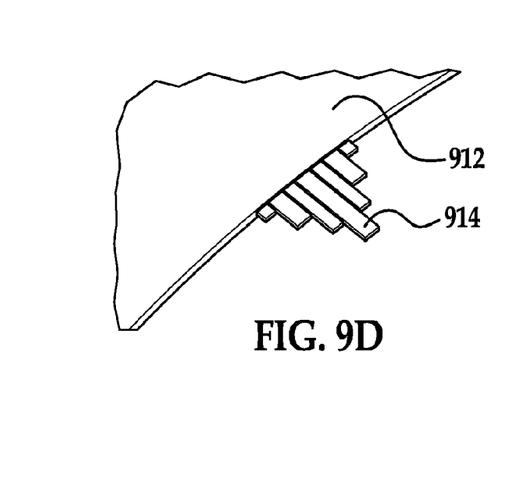
FIG. 9D is a perspective view of the process for joining fitting to the composite sandwich shell edges illustrating fittings and collars removed prior to removal of the flute mandrels.
Figure 9E:
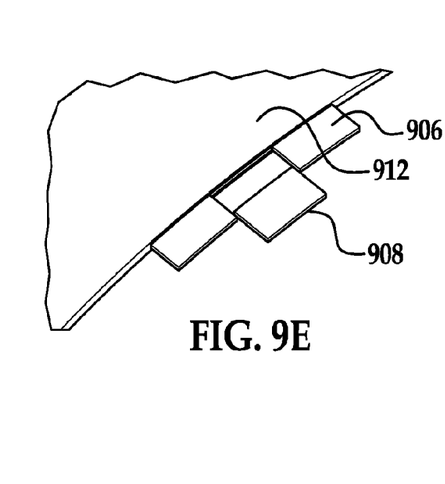
FIG. 9E is a perspective view of the process for joining fitting to the composite sandwich shell edges illustrating the fittings and the supporting inflatable collars replaced into the cavities formed between the inner facesheet and the outer facesheet.
Figure 9F:
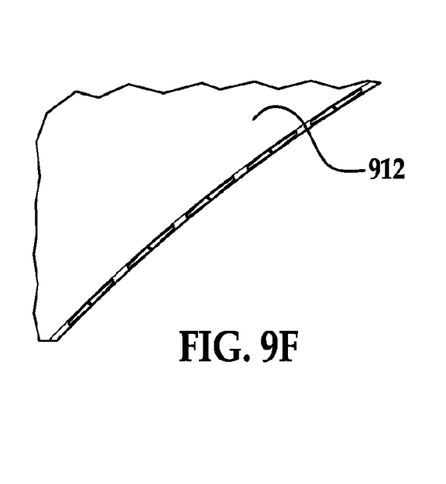
FIG. 9F is a perspective view of the process for joining fitting to the composite sandwich shell edges illustrating the inflatable collars removed.

FIGS. 9A-9F represent graphical representation of the process steps shown in FIG. 8. For instance, FIG. 9A shows an inner facesheet 902 is first laid up, and then wrapped flute mandrels 904 are placed on top. FIG. 9B shows that fittings 906 each with supporting, inflatable collars 908 and a release film 910 are then placed on top of the inner facesheet 902. In the next step of the process shown in FIG. 9C, an outer facesheet 912 is laid up over the flutes 904 and the fittings 906. FIG. 9D shows that fittings 906 and collars 908 are removed prior to the removal of the flute mandrels 914. The process then continues in FIG. 9E wherein fittings 906 and supporting inflatable collars 908 are replaced into the cavities formed between the inner facesheet 902 and the outer facesheet 912. The fittings 906 are bonded using film adhesive. In the final step of the process, shown in FIG. 9F, the inflatable collars 908 are removed to complete the skirt-end joint layup.

Figure 10:
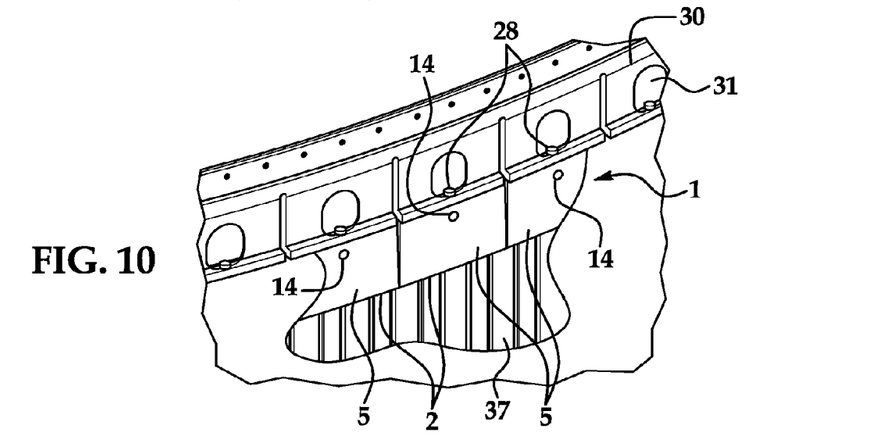
FIG. 10 is a partial, exploded perspective view of a completed composite sandwich shell edge joint.

As shown in FIG. 10, the mating side of the joint 1 may incorporate a male threaded fastener to engage the barrel nut 14. A variety of conventional joint types may be suitable for the purpose. In some applications, for example, a finger ring 30 having "mouse holes" 31 may be used for tins purpose. The finger ring 30 may be fastened to each joint 1 by extending a bolt 28 through a bolt opening (not shown) in the finger ring 30 and inserting the bolt 28 into the barrel nut installed in the joint body 2 of the joint 1. The opening in the cryotank skirt joint that allows the bolt to reach the barrel nut is shown as 38 in FIG. 3.

Figure 11:
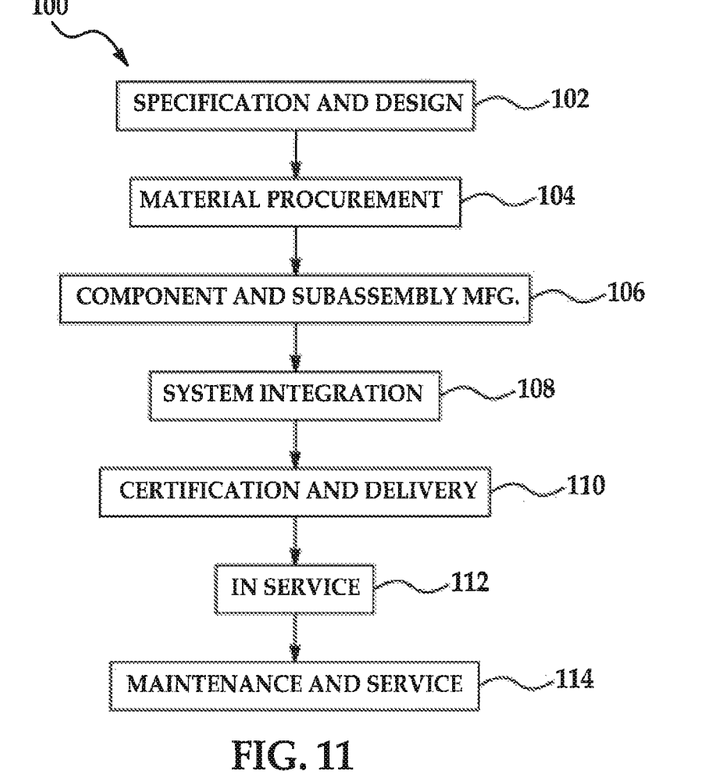
FIG. 11 is a flow diagram of a spacecraft production and service methodology.
Figure 12:
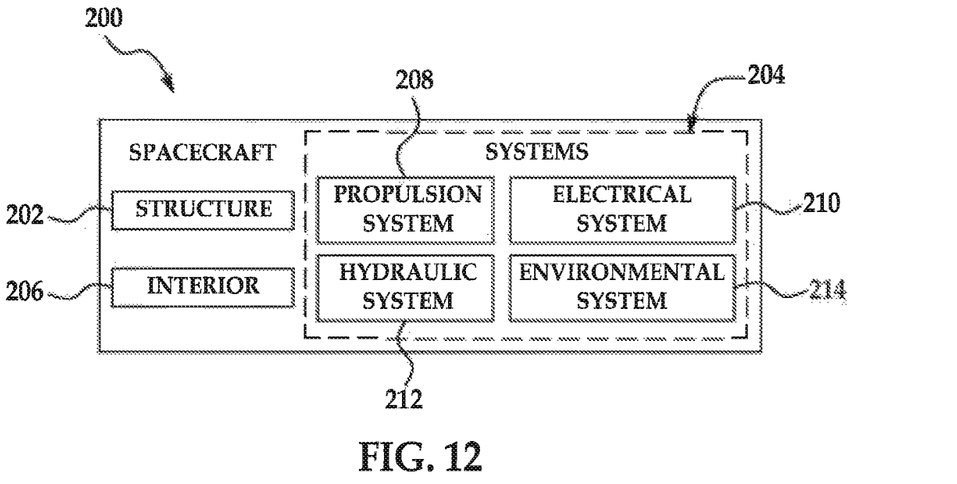
FIG. 12 is a block diagram of a spacecraft.

Referring next to FIGS. 11 and 12, embodiments of the disclosure may be used in the context of a spacecraft manufacturing and service method 100 as shown in FIG. 11 and a spacecraft 200 as shown in FIG. 12. During preproduction, exemplary method 100 may include specification and design 102 of the spacecraft 200 and material procurement 104. During production, component and subassembly manufacturing 106 and system integration 108 of the spacecraft 200 takes place. Thereafter, the spacecraft 200 may go through certification and delivery 110 in order to be placed in service 112. While in service by a customer, the spacecraft 200 may be scheduled for routine maintenance and service 114 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the spacecraft 200 produced by exemplary method 100 may include a structure 202 with a plurality of systems 204 and an interior 206. Examples of high-level systems 204 include one or more of a propulsion system 208, an electrical system 210, a hydraulic system 212, and an environmental system 214. Any number of other systems may be included. Although an aerospace example is shown, the principles of the invention may be applied to other industries, such as the automotive industry.

The apparatus embodied herein may be employed during any one or more of the stages of the production and service method 100. For example, components or subassemblies corresponding to production process 106 may be fabricated or manufactured in a manner similar to components or subassemblies produced while the spacecraft 200 is in service. Also one or more apparatus embodiments may be utilized during the production stages 106 and 108, for example, by substantially expediting assembly of or reducing the cost of a spacecraft 200. Similarly, one or more apparatus embodiments may be utilized while the spacecraft 200 is in service, for example and without limitation, to maintenance and service 114.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method comprising:
   forming an assembly of an inner facesheet, flute mandrels, first fittings including first spacers, second fittings including second spacers, and an outer facesheet;
   curing the assembly under heat and pressure;
   removing the second fittings including the second spacers and the flute mandrels from the assembly;
   inserting third fittings including third spacers between the inner and outer facesheets and effecting bonding and curing; and
   removing the first spacers from the first fittings and the third spacers from the third fittings.

2. The method of claim 1, further comprising:
   applying a layer of adhesive on the inner facesheet and positioning the first fittings including the first spacers on the inner facesheet; and
   applying a layer of adhesive on the first fittings including the first spacers and laying up the outer facesheet to form the assembly.

3. The method of claim 1, wherein removing the second fittings including the second spacers further comprises collapsing the second spacers.

4. The method of claim 1, further comprising placing an adhesive layer on the third fittings including the third spacers immediately prior to inserting the third fittings.

5. The method of claim 1, wherein removing the first spacers from the first fittings comprises collapsing the first spacers.

6. The method of claim 1, wherein curing the assembly comprises applying heat between about 250° F. and about 350° F.

7. The method of claim 1, wherein curing the assembly comprises applying a pressure between about 100 psi and about 500 psi.

8. A method comprising:
   positioning a flute mandrel on an inner facesheet;
   applying a layer of adhesive on the inner face sheet and positioning first fittings including first spacers on the inner facesheet and positioning second fittings including second spacers on the inner facesheet;
   applying a layer of adhesive over the first fittings and laying up an outer face sheet forming an assembly;
   curing the assembly under heat and pressure;
   removing the second fittings including the second spacers;
   removing the flute mandrel;
   disposing third fittings including third spacers between the inner and outer facesheets and effecting bonding and curing;
   removing the first spacers from the first fittings; and
   removing the third spacers from the third fittings.

9. The method of claim 8, wherein curing the assembly comprises applying heat between about 250° F. and about 350° F.

10. The method of claim 8, wherein the second spacers are collapsible and removing the second fittings from the assembly comprises collapsing the second spacers.

11. The method of claim 8, further comprising placing an adhesive layer on the third fittings including the third spacers immediately prior to inserting the third fittings.

12. The method of claim 8, further comprising trimming the assembly.

13. A method comprising:
   forming a first assembly including:
      an inner facesheet;
      an outer facesheet;

a first fitting positioned between the inner and outer facesheets, the first fitting including a first surface, a second surface opposite the first surface and a first spacer positioned between the first and second surfaces, the first surface including a first layer of adhesive in contact with the inner facesheet, the second surface including a second layer of adhesive in contact with the outer facesheet;

a second fitting positioned between the inner and outer facesheets, the second fitting including a third surface, a fourth surface opposite the third surface and a second spacer positioned between the third and fourth surfaces, the third and fourth surfaces including a release film; and a mandrel positioned between the inner and outer facesheets and between the first and second fittings;

curing the first assembly to bond the first surface of the first fitting to the inner facesheet and to bond the second surface of the first fitting to the outer facesheet;

removing the second fitting and the mandrel from the first assembly;

removing the release film from the third and fourth surfaces of the second fitting;

forming a second assembly by reinserting the second fitting between the inner and outer facesheets, the third surface of the reinserted second fitting including a third layer of adhesive in contact with the inner facesheet, the fourth surface of the reinserted second fitting including a fourth layer of adhesive in contact with the outer facesheet; and curing the second assembly to bond the third surface of the second fitting to the inner facesheet and to bond the fourth surface of the second fitting to the outer facesheet.

14. The method of claim 13, wherein the second spacer is collapsible and removing the second fitting from the first assembly comprises collapsing the second spacer.

15. The method of claim 13, further comprising removing the first spacer from the first fitting following the curing of the first assembly, wherein the first spacer is collapsible and removing the first spacer from the first fitting comprises collapsing the first spacer.

16. The method of claim 13, further comprising removing the second spacer from the second fitting following the curing of the second assembly, wherein the second spacer is collapsible and removing the second spacer from the second fitting comprises collapsing the second spacer.

17. The method of claim 13, wherein:
the first fitting comprises a plurality of first fittings positioned adjacent one another;
the second fitting comprises a plurality of second fittings positioned adjacent one another; and
the mandrel comprises a plurality of mandrels positioned adjacent one another.

18. A method comprising:
laying up an inner facesheet having a first end and a second end;

positioning a mandrel on the inner facesheet between the first and second ends;
applying a first layer of adhesive on the inner facesheet proximate the first end;
positioning a first fitting on the inner facesheet proximate the first end, the first fitting including a first surface, a second surface opposite the first surface and a first spacer positioned between the first and second surfaces, the first surface contacting the first layer of adhesive;
positioning a second fitting on the inner facesheet proximate the second end, the second fitting including a third surface, a fourth surface opposite the third surface and a second spacer positioned between the third and fourth surfaces, the third and fourth surfaces including a release film;
applying a second layer of adhesive on the second surface of the first fitting;
laying up an outer facesheet over the first fitting, the second fitting, and the mandrel to form a first assembly;
curing the first assembly to bond the first surface of the first fitting to the inner facesheet and to bond the second surface of the first fitting to the outer facesheet;
removing the second fitting and the mandrel from the first assembly;
removing the release film from the third and fourth surfaces of the second fitting;
applying a third layer of adhesive on the third surface and a fourth layer of adhesive on the fourth surface of the second fitting;
reinserting the second fitting between the inner and outer facesheets to form a second assembly; and
curing the second assembly to bond the third surface of the second fitting to the inner facesheet and to bond the fourth surface of the second fitting to the outer facesheet.

19. The method of claim 18, wherein the second spacer is collapsible and removing the second fitting from the first assembly comprises collapsing the second spacer.

20. The method of claim 18, further comprising removing the first spacer from the first fitting following the curing of the first assembly, wherein the first spacer is collapsible and removing the first spacer from the first fitting comprises collapsing the first spacer.

21. The method of claim 18, wherein reinserting the second fitting comprises reinserting the second fitting and the second spacer, further comprising removing the second spacer from the second fitting following the curing of the second assembly, wherein the second spacer is collapsible and removing the second spacer from the second fitting comprises collapsing the second spacer.

22. The method of claim 18, wherein:
the first fitting comprises a plurality of first fittings positioned adjacent one another;
the second fitting comprises a plurality of second fittings positioned adjacent one another; and
the mandrel comprises a plurality of mandrels positioned adjacent one another.

\* \* \* \* \*